June 1, 1948.    C. A. NERACHER    2,442,660
MOUNTING FOR TRANSMISSION SHIFTERS
Filed May 28, 1945    2 Sheets-Sheet 1

INVENTOR
Carl A. Neracher
BY
Harness and Harris
ATTORNEYS.

June 1, 1948.                    C. A. NERACHER                    2,442,660
                         MOUNTING FOR TRANSMISSION SHIFTERS
Filed May 28, 1945                                           2 Sheets-Sheet 2

INVENTOR
Carl A. Neracher.
BY
Harness and Harris
ATTORNEYS.

Patented June 1, 1948

2,442,660

UNITED STATES PATENT OFFICE 2,442,660

MOUNTING FOR TRANSMISSION SHIFTERS

Carl A. Neracher, Detroit, Mich., assignor to Chrysler Corporation, Highland Park, Mich., a corporation of Delaware Application May 28, 1945, Serial No. 596,311

10 Claims. (Cl. 74—473)

This invention relates to a shifter mechanism. More specifically it relates to connecting means for shifters employed in change-speed transmissions.

In transmissions involving a clutching member splined to a rotatable shaft and slidable therealong into driving engagement with either of two transmission gears, the clutching member may be shifted by a fork engaging a circumferential groove in the clutching member at opposite sides thereof, and the fork may be oscillated by a rock shaft extending in transverse non-intersecting relation to the rotatable shaft, or the fork may be moved along the rotatable shaft by means of a rail parallel to the rotatable shaft, to which rail the fork is fixed or may be moved along the rail by some other means. With any of the above constructions there will be a tendency for the shifter not to move directly along the rotatable shaft but at a slight angle thereto, because of some slight inaccuracy in the positioning of the rock shaft or rail with respect to the rotatable shaft. I have invented new connections for shifters that will overcome the drawbacks of such inaccuracies.

An object of the present invention is to provide improvements in the mounting of a shifter for moving a clutching member. This may involve provision for rocking of the shifter with respect to its mounting.

A further object is the provision of an improved mounting for a control member on a rock shaft. The control member may be employed to shift a clutching member in a transmission along a rotatable shaft to which the clutching member is splined.

Another object is the provision of an improved mounting for a control member on a slidable rail. The control member may be employed to shift a clutching member along a shaft in a transmission.

Other objects will appear from the disclosure.

In the drawing:

Fig. 5 is a sectional view taken on the line 5—5 of Fig. 1.

Figures 1, 3:
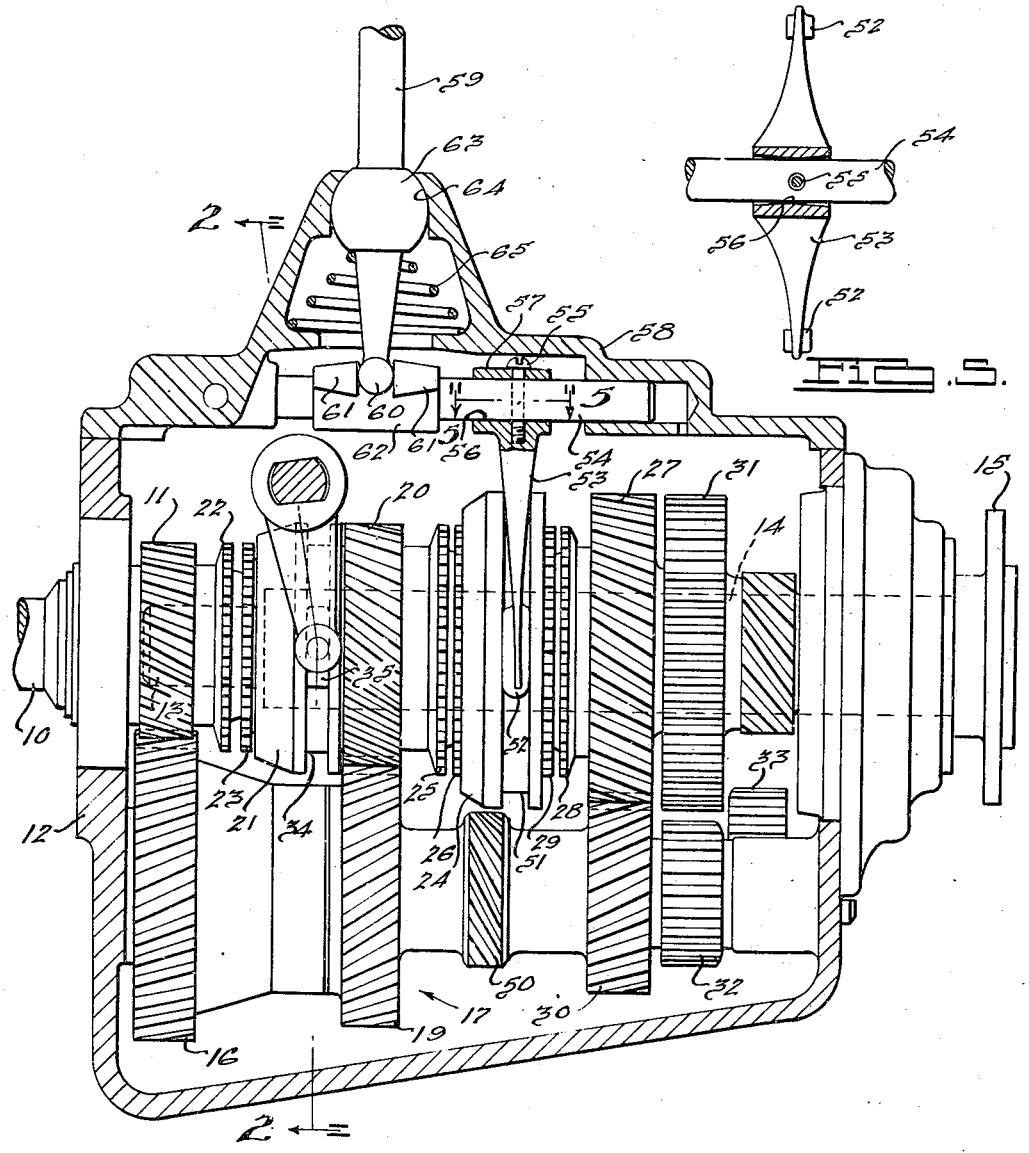
Fig. 1 is a longitudinal sectional view through a change-speed transmission.
Fig. 3 is a sectional view taken on the line 3—3 of Fig. 2.
Figure 2:
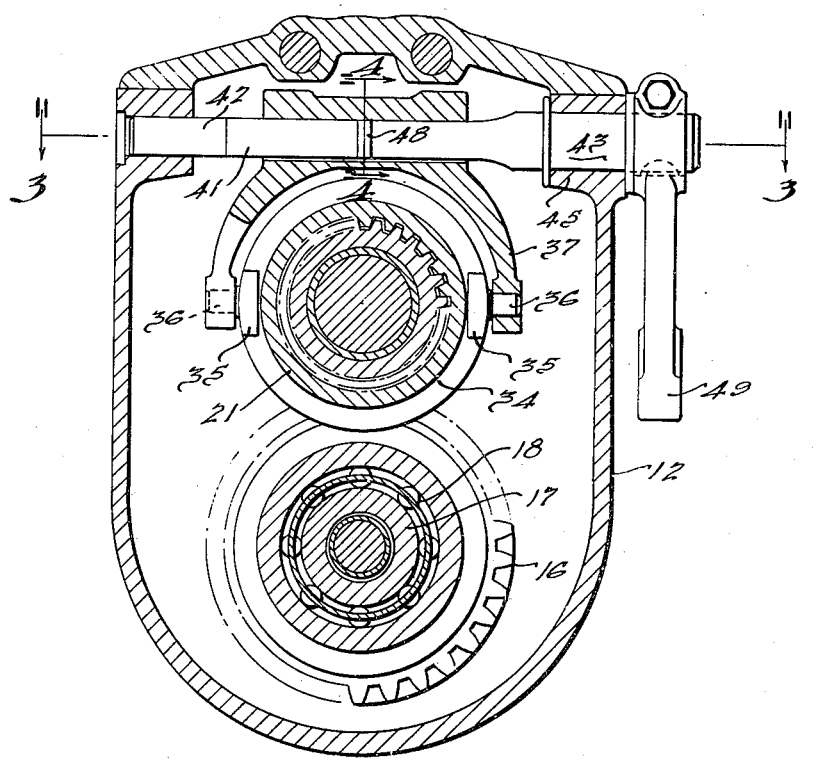
Fig. 2 is a sectional view taken on the line 2—2 of Fig. 1.
Figure 3:
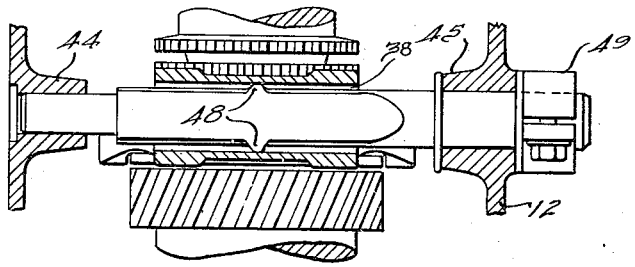

A driving shaft 10, which may be connected to an engine not shown, terminates in a gear 11, positioned just within the left end of a transmission casing 12, as viewed in Fig. 1. Piloted within the gear 12 is a reduced end 13 of a driven shaft 14, extending out of the right end of the casing 12 and having a driving flange 15 secured thereto. The gear 11 meshes continuously with a gear 16, mounted on and connected with a gear cluster 17 through a one-way clutch 18, shown in Fig. 2. A gear 19 of the gear cluster 17 is in constant mesh with a gear 20, rotatably mounted on the driven shaft 14. A clutching member 21 is splined on a hub portion of the gear 20 and is adapted to be shifted into a driving connection with the gear 11 through engagement of internal teeth on the clutching member with clutch teeth 22. A blocker 23 is shown between the clutching member 21 and clutch teeth 22. A clutching member 24 is splined on the driven shaft 14 and is shiftable to the left as viewed in Fig. 1 into driving engagement with the gear 20, engagement of internal teeth on the clutching member 24 with clutch teeth 25 on the gear 20 taking place. A blocker 26 lies between clutch teeth 25 and clutching member 24. The clutching member 24 is shiftable to the right into driving engagement with a gear 27, rotatably mounted on the driven shaft 14, engagement of internal teeth on the clutching member 24 with clutch teeth 28 on the gear 27 taking place. A blocker 29 lies between the clutching member 24 and the clutch teeth 28 of the gear 27. The gear 27 is in constant mesh with a gear 30 of the gearset 17. A gear 31, fixed to the driven shaft 14, is adapted to have driving connection with a gear 32 of the gearset 17 through a reverse idler gear 33, which is adapted to be shifted to the left into mesh with gears 31 and 32, as viewed in Fig. 1.

Figure 4:
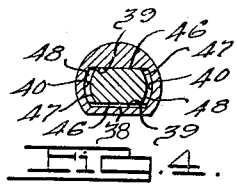
Fig. 4 is a sectional view taken on the line 4—4 of Fig. 2.

The clutching member 21 has a circumferential groove 34, in which are positioned shoes 35. The shoes have round bearing portions 36 received in openings in the ends of a shifter fork 37. The shifter fork has at a central portion a through opening 38 of considerable length. As seen in Fig. 4, the opening 38 is generally rectangular in shape, two opposed long sides 39 being straight, and two other opposed short sides 40 being convex. A rockshaft 41 extends through the opening 38 and has circular end portions 42 and 43 journalled, respectively, in thick bearing portions 44 and 45 formed in the transmission casing 12. The portion of the rockshaft 41 in the opening 38 is generally rectangular, two opposed long sides 46 being straight and two opposed short sides 47 being convex. The thickness of the portion of the rockshaft 41 within the opening in the shifter 37 is about the same as that of the opening so that the upper straight side 46 closely fits the upper straight side 39, and there is only a slight clearance between the lower straight side 46 and the lower straight side 39. However, except at the portion of the rockshaft at the mid section of the length of the opening 38 in the shifter 37, the width of the rockshaft is definitely less than that of the opening so that the convex sides 47 of the rockshaft 41 are spaced from the convex sides 40 of the opening 38. At the mid section of the length of the opening there are ribs 48 on the convex sides 47 engaging the convex sides 40 of the opening 38. Thus the shifter 37 may rock with respect to the rockshaft 41 in a plane parallel to the straight sides 39 and 46 of the opening 38 and the rockshaft 41 about the ribs 48 on the rockshaft. Such rocking will permit a slight deviation of the rockshaft 41 from a position transverse of the axis of the driven shaft 14 without a tendency for one shoe 35 to be displaced with respect to the other shoe 35 axially of the driven shaft 14. On the other hand, the relatively close fit of the straight sides of the opening in the shift fork and the rockshaft causes any angular movement of the rockshaft to result in shifting of the clutching member 21 along the driven shaft 24 toward or away from the gear 21. On the end portion 43 of the rockshaft 41 outside the transmission casing 12 is secured an arm 49, which may control the angular position of the rockshaft 41 in accordance with speed conditions through a gear 50 on the gearset 17 and other connecting means not shown.

The clutching member 24 has a circumferential groove 51 in which rest shoes 52 formed on the ends of a shifter fork 53. The shifter fork 53 is secured to a rail 54 by means of a screw 55 passing through the shifter 53. The rail 54 passes through an opening 56 in a wide portion 57 of the shifter 53. The opening 56 is generally circular at a mid region through which the screw 55 passes and fits the rail 54 closely at this region. At the end regions the opening 56 fits the rail 54 closely at top and bottom, as seen in Fig. 1, and loosely at the sides, as seen in Fig. 5. This permits a slight rocking movement of the shifter fork 53 about the rail 54, which provides compensation for any slight out-of-parallel condition of the rail 54 and the driven shaft 14 involving deviation from a plane containing the axes of the rail 54 and the driven shaft 14. The rail 54 is mounted for lengthwise sliding movement in a cover 58 for the transmission casing 12. Such lengthwise movement is provided by a control member 59 having a ball portion 60 at its lower end fitting between projections 61 on a collar 62 secured to the rail 54. A ball portion 63 on the control member 59 is journalled in a spherical opening 64 in the casing cover 58. A spring 65 holds the ball portion 63 in the opening 64. Thus provision for pivoting of the control member 59 is made.

Assume that the clutching member 21 is in the position shown in Fig. 1. Then drive is transmitted from the gear 11 on the driving shaft 10 through the gears 16 and 19 to the gear 20. If the clutching member 24 engages the gear 20, then drive is transmitted from the gear 20 through the clutching member 24 to the driven shaft 14.

If the clutching member 24 engages the gear 27, then drive is transmitted from the gear 11 through the gears 16, 30, and 27, and the clutching member 24 to the driven shaft 14.

If the clutching member 21 engages the gear 11, and the clutching member 24 engages the gear 20, then drive is transmitted directly from gear 11 through clutching member 21, gear 20, and gear 24 to the driven shaft 14.

If the clutching member 21 engages the gear 11, and the clutching member 24 engages the gear 27, then drive is transmitted from the gear 11 through clutching member 21, gears 20, 19, 30, and 27, and clutching member 24 to the driven shaft 14.

Thus four forward speeds are provided.

If a reverse drive is desired, the clutching member 24 is maintained, as shown in Fig. 1, out of engagement with gears 20 and 27, and the clutching member will probably be in the position shown in Fig. 1, out of engagement with the gear 11, and the reverse idler gear 33 is shifted into engagement with the gears 31 and 32. Then drive will be transmitted from gear 11 on driving shaft 10 through gears 16, 32, 33, and 31 to driven shaft 14.

I claim:

1. In an assembly comprising a rotatable shaft, a clutch member driving connected to the rotatable member and shiftable along the rotatable member, a shifter partially embracing the clutch member and engaging the clutch member at spaced regions, the shifter having a through opening of considerable length extending in generally parallel relation to a line between the aforementioned regions and in transverse non-intersecting relation to the axis of the rotatable member and having opposed parallel planar surfaces extending generally parallel to the axis of the rotatable member, the combination with the shifter opening, of a rockshaft extending through the shifter opening and having opposed parallel planar surfaces spaced apart an amount equal to the spacing of the opposed parallel planar surfaces of the shifter opening so as to fit closely within the planar surfaces of the shifter opening, the dimensions of the rockshaft parallel to the planar surfaces thereof being, except at a region central of the length of the portion of the rockshaft in the shifter opening less than corresponding dimensions of the shifter opening, the dimensions of the rockshaft parallel to the planar surfaces thereof at the aforesaid central region being equal to the corresponding dimensions of the shifter opening, whereby the shifter may pivot with respect to the rockshaft about the aforesaid central region thereof only parallel to the planar surfaces of the rockshaft and the shifter opening.

2. In an assembly comprising a rotatable shaft, a clutch member drivingly connected to the rotatable member and shiftable along the rotatable member, a shifter partially embracing the clutch member and engaging the clutch member at spaced regions, the shifter having a through opening of considerable length extending in generally parallel relation to a line between the aforementioned regions and in transverse non-intersecting relation to the axis of the rotatable member and having opposed parallel planar surfaces extending generally parallel to the axis of the rotatable member, the combination with the shifter opening, of a rockshaft extending through the shifter opening and having opposed parallel planar surfaces spaced apart an amount equal to the spacing of the opposed parallel planar surfaces of the shifter opening so as to fit closely within the planar surfaces of the shifter opening, the opposed connecting surfaces of the rockshaft between the planar surfaces thereof being except at a region central of the length of the portion of the rockshaft in the shifter opening spaced apart less than the opposed connecting surfaces of the shifter opening between the planar surfaces thereof, the connecting surfaces of the rockshaft being provided at the aforesaid central region with ribs extending between the planar surfaces of the rockshaft and closely fitting the connecting surfaces of the shifter opening, whereby the shifter may pivot with respect to the rockshaft about the region of the ribs on the rockshaft only parallel to the planar surfaces of the rockshaft and the shifter opening.

3. In an assembly comprising a rotatable member, a clutch member shiftable along the rotatable member and drivingly connected thereto, a shifter partially embracing and engaging spaced regions of the clutch member and having a through opening of considerable length extending in generally transverse non-intersecting relation to the axis of the rotatable shaft, the combination with the opening in the shifter, of a rockshaft extending through the shifter opening and being so proportioned with respect thereto as to fit the shifter opening closely in a direction transverse to the axis of the rotatable member and to fit the shifter opening loosely in a direction parallel to the axis of the rotatable member except at a region of the shifter opening central of the length thereof, where the fit is tight.

4. In an assembly comprising a rotatable member, a clutch member shiftable along the rotatable member and drivingly connected thereto, a shifter partially embracing and engaging spaced regions of the clutch member and having a through opening of considerable length extending in generally transverse non-intersecting relation to the axis of the rotatable shaft, the combination with the opening in the shifter, of a rockshaft extending through the shifter opening and fitting the shifter opening so as to provide for slight pivoting of the shifter with respect to the rockshaft in a plane generally parallel to the axis of the rotatable shaft and to prevent such pivoting in a plane generally transverse to the axis of the rotatable member.

5. In an assembly comprising a rotatable member, a clutch member shiftable along the rotatable member and drivingly connected thereto, a shifter partially embracing and engaging spaced regions of the clutch member and having a through opening of considerable length extending in generally transverse non-intersecting relation to the axis of the rotatable shaft, the combination with the opening in the shifter, of a rockshaft extending through the shifter opening and fitting the shifter opening so as to provide for slight pivoting of the shifter about a region of the rockshaft central of the length of the shifter opening in a plane generally parallel to the axis of the rotatable member and to prevent all movement of the shifter with respect to the rockshaft in a plane generally transverse to the axis of the rotable member.

6. In an assembly comprising a rotatable member, a clutch member shiftable along the rotatable member and drivingly connected thereto, a shifter partially embracing the clutch member and engaging spaced regions thereof, and an axially shiftable rail positioned parallel to the axis of the rotatable member, the combination with the shaft and the shifter, of means associating the shifter and the rail so as to cause axial shifting of the rail to make the shifter shift the clutch member along the rotatable member and to provide for limited pivotal movement of the shifter with respect to the rail, said means comprising an opening in the shifter receiving the rail and having a region central of the length of the opening fitting the rail closely and other regions fitting the rail loosely and means acting at the central region of the shifter opening to secure the rail to the shifter.

7. In an assembly comprising a rotatable member, a clutch member shiftable along the rotatable member and drivingly connected thereto, a shifter partially embracing the clutch member and engaging spaced regions thereof, and an axially shiftable rail positioned parallel to the axis of the rotatable member, the combination with the shaft and the shifter, of means associating the shifter and the rail so as to cause axial shifting of the rail to make the shifter shift the clutch member along the rotatable member and to provide for limited pivotal movement of the shifter with respect to the rail, said means comprising an opening in the shifter formed relatively small at a central region and relatively large at end regions and receiving the rail and a screw passing through the rail and secured to the central region of the opening.

8. In an assembly comprising a rotatable member, a clutch member slidable along the rotatable member and drivingly connected thereto, a clutch member partially embracing the shifter and engaging spaced regions thereof, and a shaft-like element, the combination with the shaft-like element and the shifter, of means associating the shifter and the shaft-like element so as to cause movement of the shaft-like element to make the shifter shift the clutch member along the rotatable member and to provide for limited pivotal movement of the shifter with respect to the shaft-like element, said means comprising an opening in the shifter closely fitting the shaft-like member at a region central of the length of the opening and loosely fitting the shaft-like member at the end regions of the opening.

9. In an assembly comprising a rotatable member, a clutch member shiftable along the rotatable member and drivingly connected thereto, a shifter partially embracing the clutch member and engaging spaced regions thereof, and an axially shiftable rail positioned parallel to the axis of the rotatable member, the combination with the shaft and the shifter, of means associating the shifter and the rail so as to cause axial shifting of the rail to make the shifter shift the clutch member along the rotatable member and to provide for limited pivotal movement of the shifter with respect to the rail, said means comprising an opening in the shifter formed so as to have a central region closely fitting the rail on all sides and end regions closely fitting the rail on two opposite sides and loosely fitting the rail on two other opposite sides and means passing through the rail and secured to the central region of the shifter opening for preventing relative movement of the shifter along the rail.

10. In an assembly comprising a rotatable member, a clutch member shiftable along the rotatable member and drivingly connected thereto, a shifter partially embracing the clutch member and engaging spaced regions thereof, and an axially shiftable rail positioned parallel to the axis of the rotatable member, the combination with the shaft and the shifter, of means associating the shifter and the rail so as to cause axial shifting of the rail to make the shifter shift the clutch member along the rotatable member and to provide for limited pivotal movement of the shifter with respect to the rail, said means comprising an opening in the shifter formed so as to have a central region of circular shape closely fitting the rail on all sides and end regions of elliptical shape closely fitting the rail on two opposite sides considered in a plane containing the axes of the rail and the rotatable shaft and loosely fitting the rail on two opposite sides considered on opposite sides of a plane containing the aforesaid axes, and a screw passing through the rail between the two opposite sides of the shifter opening and threaded into the shifter.

CARL A. NERACHER.

REFERENCES CITED

The following references are of record in the file of this patent:

UNITED STATES PATENTS

| Number | Name | Date |
|---|---|---|
| 1,035,503 | Webb | Aug. 13, 1912 |
| 1,963,387 | Simpson | June 19, 1934 |
| 2,328,088 | Magee | Aug. 31, 1943 |